United States Patent [19]

Shea

[11] Patent Number: 5,184,804

[45] Date of Patent: Feb. 9, 1993

[54] CONTAMINATION CONTAINMENT DEVICE

[75] Inventor: Stephen F. Shea, Newport News, Va.

[73] Assignee: Siemens Automotive L.P., Auburn Hills, Mich.

[21] Appl. No.: 881,576

[22] Filed: May 12, 1992

[51] Int. Cl.⁵ ............................................. F16K 51/00
[52] U.S. Cl. .................................. 251/365; 251/359; 137/315
[58] Field of Search ............... 251/362, 365, 359, 361; 137/15, 315; 29/888.44

[56] References Cited

U.S. PATENT DOCUMENTS

| | | | |
|---|---|---|---|
| 2,078,903 | 4/1937 | Domack | 251/365 |
| 2,471,880 | 5/1949 | MacDonald | 251/365 |
| 4,531,710 | 7/1985 | Tort | 251/365 |

FOREIGN PATENT DOCUMENTS 1373818  11/1974  United Kingdom .............. 251/362

Primary Examiner—A. Michael Chambers
Attorney, Agent, or Firm—George L. Boller; Russel C. Wells

[57] ABSTRACT

A saw-tooth shaped groove around the outside of a valve seat cooperates with the wall of a bore into which the valve seat is pressed to capture material displaced from the wall of the bore during the step of pressing the valve seat into the bore.

3 Claims, 1 Drawing Sheet

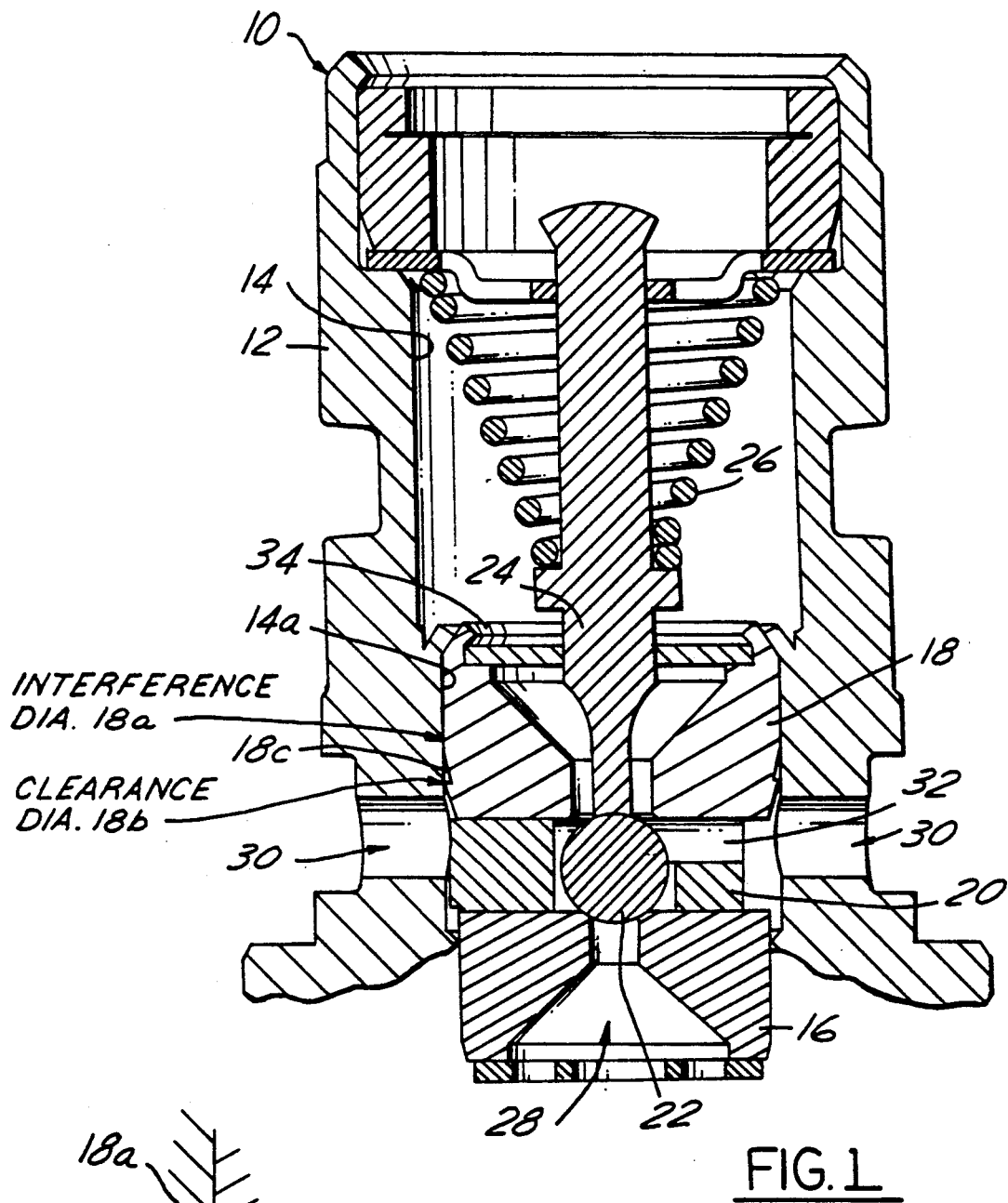
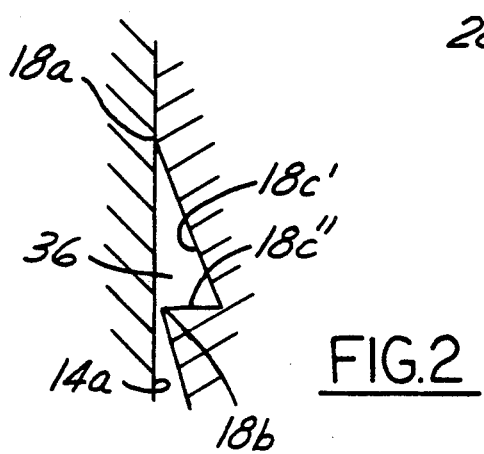

CONTAMINATION CONTAINMENT DEVICE

BACKGROUND AND SUMMARY OF THE INVENTION

When the process of fabricating an assembly comprises the pressing of one part into the bore of another part, it is possible that material which is displaced from the bore by the pressing operation may separate. If the bore has a shoulder forming a stop against which the pressed-in part is abutted, and if such shoulder and an immediately contiguous sidewall of the bore are imperforate, it is essentially impossible for any such separated material to escape its confinement and to become a source of potential contamination. However if there is no such confinement, such separated material can become a source of potential contamination that may give rise to undesirable consequences. For example, the escape of such separated material would be especially undesirable in the case of a hydraulic valve.

The present invention relates to an improvement that is intended to address this situation in a manner that will significantly reduce the potential for escape of separated displaced bore material in an assembly where, absent the invention, there would exist no such imperforate confinement zone for separated material.

The disclosure is accompanied by a drawing of an example of principles of the invention according to a presently preferred embodiment and to the best mode presently contemplated for carrying out the invention.

BRIEF DESCRIPTION OF THE DRAWING

FIG. 1 is a longitudinal cross sectional view through a portion of a hydraulic valve assembly.

FIG. 2 is an enlarged fragmentary view.

DESCRIPTION OF THE PREFERRED EMBODIMENT

A hydraulic valve assembly 10 has a metal body 12 comprising a circular machined bore 14. Disposed within bore 14 are two metal seat members 16 and 18 which sandwich an annular spacer member 20. A spherical valve element 22 is captured by these three members, but is displaceable axially within the valve to selectively seat on the respective seat members. The valve assembly also has an actuating mechanism, including a pin 24 and a spring 26, for operating valve element 22. FIG. 1 shows one position of the valve element wherein the bias imparted to pin 24 by spring 26 causes the valve element to be seated on member 16 so as to block a first port 28 from a second port 30. When pin 24 is displaced by the actuating mechanism toward the top as viewed in FIG. 1, increasingly compressing spring 26 in the process, flow can occur between the two ports. Please observe that member 20 has one or more radial passages 32 through which the flow passes.

Bore 14 has a bore portion 14a into which seat member 18 has been pressed. After the pressing, the bore is staked over the seat member as indicated at 34. Thus, the pressing-in takes places from the top as viewed in FIG. 1 before the staking 34. Both bore portion 14a and the O. D. of seat member 18 are circular cylindrical. Seat member 18 is a machined part that may be considered to have: an interference diameter wall portion 18a that provides the press-fit to the bore; a clearance diameter wall portion 18b that is of slightly smaller diameter than the diameter of bore portion 14a; and a groove portion 18c between portions 18a and 18b which in cooperation with the surrounding portion of bore portion 14a forms a confinement space 36. Groove portion 18c may be considered to have a saw-tooth shape having a longer tapered wall portion 18c' and a shorter steeper wall portion 18c'', as shown. The included angle between wall portion 18c' and wall portion 18a is 172.5 degrees.

As seat member 18 is inserted into bore portion 14a from the top, wall portion 18b and groove 18c will clear the bore wall; interference will be encountered once wall portion 18a attempts to enter, and this is where the pressing begins. The pressing will result in displacement of material from wall portion 18a until the seat member abuts spacer member 20 to arrest the insertion. Displaced material that has been pushed forward by the advancing seat member will be disposed in confinement space 36. It is axially entrapped by the press-fit on the right. Although on the left there is clearance between clearance diameter wall portion 18b and bore portion 14a that is exposed to hydraulic fluid flow through the valve, that clearance is just slightly less than the bore diameter so that any separated displaced material larger than this clearance will not escape the confinement zone. In this way the likelihood that separated displaced material will escape and enter the flow of hydraulic fluid is significantly reduced by the present invention.

One example of a valve has the following nominal dimensions:

Clearance diameter: 7.183 mm.
Bore diameter: 7.239 mm.
Interference diameter: 7.280 mm.

What is claimed is:

1. A hydraulic valve comprising a valve body having a bore into which a seat member is pressed, said seat member comprising an interference diameter portion that displaces material from the bore and advances such displaced material as the seat member is pressed into the bore, characterized by the inclusion in said seat member of a groove in advance of said interference diameter portion and of a clearance diameter portion in advance of said groove, said clearance diameter portion having a diameter just slightly less than that of said bore so as to provide a small clearance to said bore such that said clearance diameter is in non-interference with said bore during pressing of the seat member into the bore, said clearance being exposed to hydraulic fluid flow through the valve, said groove and a surrounding portion of said bore forming a confinement space for displaced material that has been advanced by the pressing of said interference diameter portion into the bore.

2. A hydraulic valve as set forth in claim 1 characterized further in that said groove is saw-tooth shaped.

3. A hydraulic valve as set forth in claim 2 characterized further in that said groove has an included angle with said interference diameter portion of approximately 172.5 degrees.

* * * * *